(12) United States Patent
Fung et al.

(10) Patent No.: US 10,130,205 B2
(45) Date of Patent: Nov. 20, 2018

(54) TEMPERATURE SENSING SYSTEM FOR A COOKING APPLIANCE

(71) Applicants: Kam Fai Fung, Hong Kong (CN); Kin Man Lai, Hong Kong (CN)

(72) Inventors: Kam Fai Fung, Hong Kong (CN); Kin Man Lai, Hong Kong (CN)

(73) Assignee: CONAIR CORPORATION, Stamford, CT (US)

( * ) Notice: Subject to any disclaimer, the term of this patent is extended or adjusted under 35 U.S.C. 154(b) by 145 days.

(21) Appl. No.: 13/957,856

(22) Filed: Aug. 2, 2013

(65) Prior Publication Data

US 2015/0037472 A1 Feb. 5, 2015

(51) Int. Cl.
*A47J 27/62* (2006.01)
*A23L 1/01* (2006.01)
*A47J 36/32* (2006.01)
*A47J 37/06* (2006.01)
*A23L 5/10* (2016.01)

(52) U.S. Cl.
CPC ............... *A47J 27/62* (2013.01); *A23L 5/10* (2016.08); *A47J 36/32* (2013.01); *A47J 37/0611* (2013.01)

(58) Field of Classification Search
CPC .... A23L 1/01; A47J 27/62; A47J 36/32; A47J 37/0611
USPC ........... 99/331, 342, 372; 426/231; 374/100, 374/198–200, 205–207
See application file for complete search history.

(56) References Cited

U.S. PATENT DOCUMENTS

| | | | |
|---|---|---|---|
| 2,033,060 A | 3/1936 | Anderson | |
| 2,057,501 A | 10/1936 | Parr | |
| 2,607,287 A | 8/1952 | Price | |
| 2,657,580 A * | 11/1953 | Schroeder | 374/183 |
| 2,719,903 A | 10/1955 | Oertli | |
| 4,036,995 A | 7/1977 | Koether et al. | |
| 4,088,067 A | 5/1978 | Kaebitzsch et al. | |
| 4,206,345 A | 6/1980 | Maass et al. | |
| 4,697,504 A | 10/1987 | Keating | |
| 5,237,914 A | 8/1993 | Carstensen | |
| 5,467,696 A | 11/1995 | Everhart | |
| 5,531,155 A | 7/1996 | Pellicane et al. | |
| 5,712,466 A | 1/1998 | Spicer | |
| 5,743,647 A * | 4/1998 | Chen | G01K 13/002 374/151 |
| 5,758,568 A | 6/1998 | Moravec | |
| 5,848,567 A | 12/1998 | Chiang | |
| 5,992,302 A | 11/1999 | Geisler | |

(Continued)

FOREIGN PATENT DOCUMENTS

GB 2397157 A * 7/2004 .......... A47J 37/0611

*Primary Examiner* — Tu B Hoang
*Assistant Examiner* — Diallo I Duniver
(74) *Attorney, Agent, or Firm* — Grogan, Tuccillo & Vanderleeden, LLP

(57) ABSTRACT

A cooking appliance including a temperature sensing system having an upper housing having a first heating surface and a lower housing having a second heating surface includes a temperature sensing probe, a control panel and a control unit in electrical communication with the temperature sensing probe and the control panel. The temperature sensing probe is removably received by the upper housing and extends through the first heating surface. The control panel has one or more input buttons for allowing a user to select at least one input parameter including a desired internal temperature of a food item.

12 Claims, 9 Drawing Sheets

(56) References Cited

U.S. PATENT DOCUMENTS

| | | | |
|---|---|---|---|
| 6,062,130 | A | 5/2000 | Brady |
| D436,498 | S | 1/2001 | Carlson et al. |
| 6,389,959 | B1 | 5/2002 | Robertson |
| 6,439,108 | B1 | 8/2002 | Wu |
| RE37,988 | E | 2/2003 | Uss |
| 6,539,842 | B1 | 4/2003 | Chapman et al. |
| 6,591,740 | B1 | 7/2003 | Hsu |
| 6,595,116 | B1 | 7/2003 | Lin |
| 6,705,306 | B1 | 3/2004 | Dickey |
| 6,893,155 | B2 * | 5/2005 | Kaiser et al. ............ 374/187 |
| 7,514,655 | B2 | 4/2009 | Fernandez et al. |
| 7,520,668 | B2 * | 4/2009 | Chen ............ G01J 5/02 374/121 |
| 7,605,349 | B2 * | 10/2009 | Gaynor et al. ............ 219/442 |
| 7,608,803 | B2 | 10/2009 | Jerovsek |
| 7,717,028 | B2 | 5/2010 | Serra |
| 7,820,947 | B2 * | 10/2010 | Gaynor et al. ............ 219/442 |
| 8,122,816 | B2 | 2/2012 | Yu |
| 8,261,657 | B2 | 9/2012 | Serra et al. |
| 2004/0074398 | A1 * | 4/2004 | Griffin ............ A23L 1/0128 99/342 |
| 2005/0139086 | A1 | 6/2005 | McHutchison |
| 2009/0165774 | A1 | 7/2009 | Johnston et al. |
| 2010/0006558 | A1 * | 1/2010 | McLoughlin et al. ........ 219/392 |
| 2012/0137897 | A1 | 6/2012 | Tahincioglu |
| 2012/0148713 | A1 * | 6/2012 | Owensby ............ A23L 1/01 426/233 |

* cited by examiner

TEMPERATURE SENSING SYSTEM FOR A COOKING APPLIANCE

FIELD OF THE INVENTION

The present invention relates to cooking appliances and, more particularly, to an temperature sensing system for a cooking appliance.

BACKGROUND OF THE INVENTION

Cooking appliances, and in particular electric cooking/grilling devices such as griddles, are known. These grilling devices typically have a lower housing having a lower cooking surface and an upper housing having an upper cooking surface, wherein the cooking surfaces are typically heated by an electrical resistance heater. A handle attached to the upper housing allows a user to raise and lower the upper housing relative to the lower housing to accommodate a food item therebetween to be heated.

While existing grilling devices are generally suitable for what is regarded as ordinary performance, there is room for improvement in terms of convenience, ease of use and increased functionality. As will be readily appreciated, to determine the temperature or doneness of food items, typical grills require a user to open the grill and pause cooking in order to insert a thermometer. In view of the tedious nature of this process, there is a need for a cooking appliance that includes a means for measuring the doneness of food items during cooking.

SUMMARY OF THE INVENTION

It is an object of the present invention to provide a cooking appliance having a temperature sensing system.

It is another object of the present invention to provide a temperature sensing system for a cooking appliance for detecting the internal temperature of a food item during cooking.

These and other objects are achieved by the present invention.

According to an embodiment of the present invention, a temperature sensing system for a cooking appliance having an upper housing having a first heating surface and a lower housing having a second heating surface includes a temperature sensing probe, a control panel and a control unit in electrical communication with the temperature sensing probe and the control panel. The temperature sensing probe is removably received by the upper housing and extends through said first heating surface. The control panel has one or more input buttons for allowing a user to select at least one input parameter including a desired internal temperature of a food item.

According to another embodiment of the present invention a cooking appliance is provided. The cooking appliance includes an upper housing having an upper heating surface and a lower housing having a lower heating surface, a temperature sensing probe received by the upper housing and extending through the upper heating surface, a control panel having one or more input buttons for allowing a user to select at least one input parameter, and a control unit in electrical communication with the temperature sensing probe and the control panel. The at least one input parameter includes a desired internal temperature or doneness of a food item.

According to yet another embodiment of the present invention, a method of operating a cooking appliance having an upper heating surface and a lower heating surface is provided. The method includes the steps of equipping the cooking appliance with a control unit and a temperature sensing probe, and operating the upper heating surface and the lower heating surface in dependence upon data from the temperature sensing probe.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
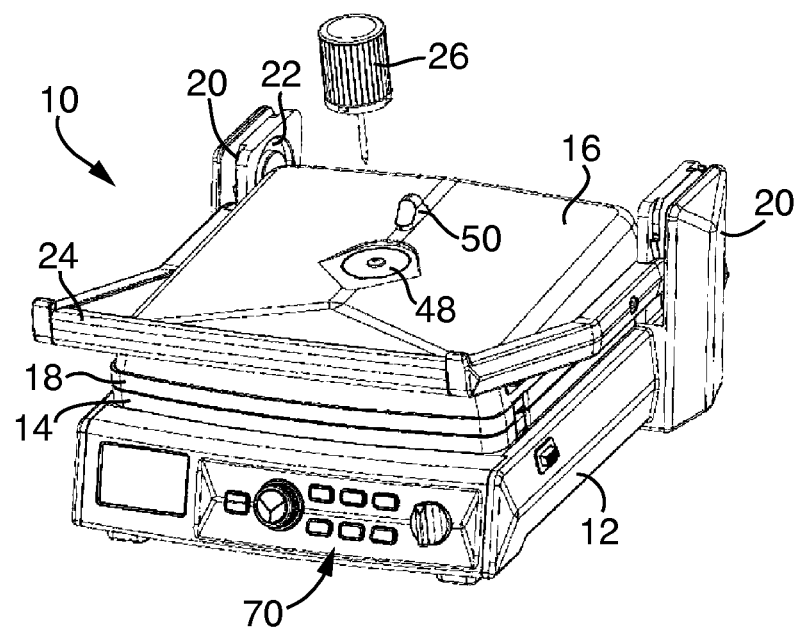
FIG. 1 is a perspective view of a cooking appliance having a temperature sensing probe according to another embodiment of the present invention.
Figure 2:
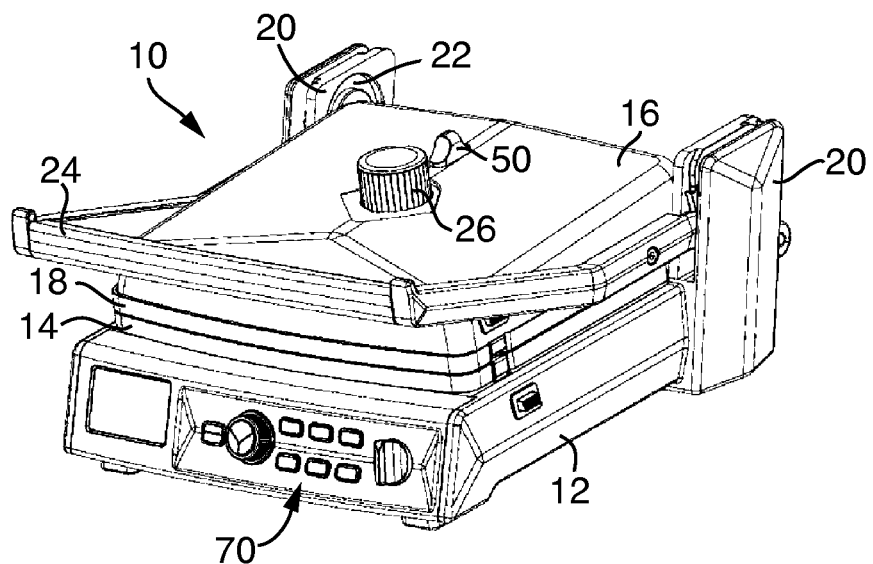
FIG. 2 is another perspective view of the cooking appliance of FIG. 1.

Referring to FIGS. 1 and 2, a cooking appliance 10 according to an embodiment of the present invention is shown. As shown therein, the cooking appliance 10 generally takes the form of a countertop grill and includes a lower housing 12 having a lower heating/cooking plate 14 and an upper housing 16 having an upper heating/cooking plate 18. The upper housing 16 is operatively connected to the lower housing 12 via opposed frame members 20 extending from the lower housing 16. In particular, as shown therein, the upper housing 16 rides in a guide track 22 in the frame members 20. A handle 24 attached to the upper housing 16 allows a user to raise and lower the upper housing 16 in the guide track 22 in order to selectively position the upper housing 16 in various positions in relation to the lower housing 12.

Figure 3:
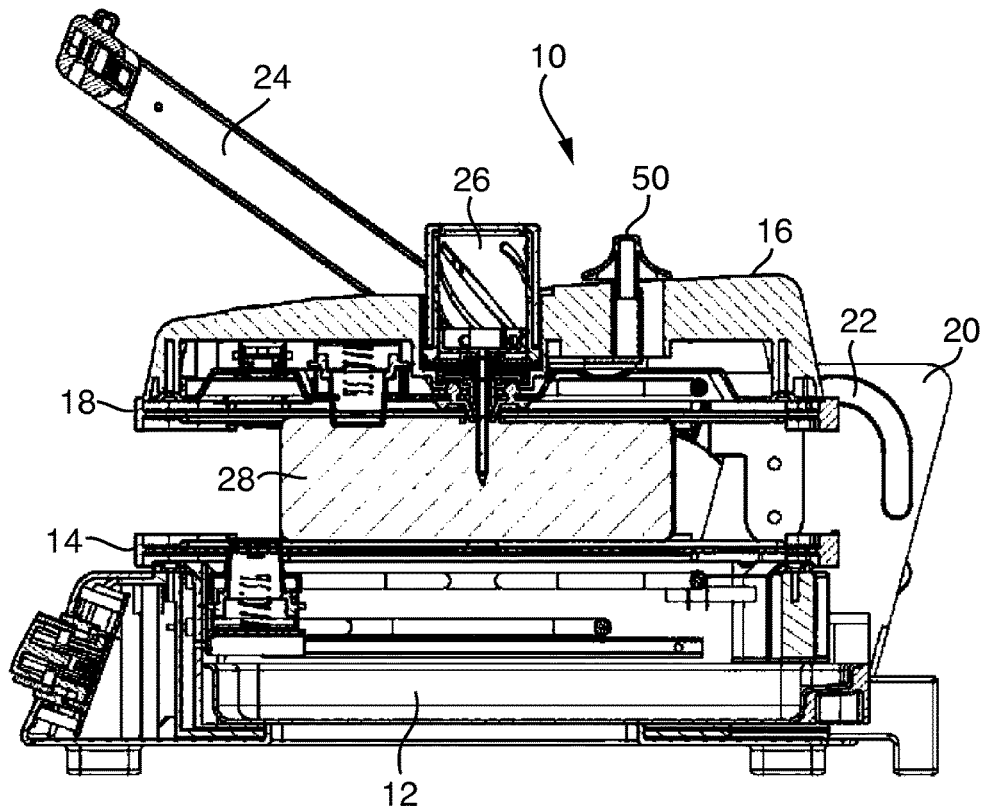
FIG. 3 is a side-cross sectional view of the cooking appliance of FIG. 1.

As best shown in FIGS. 1-3, the cooking appliance 10 also includes a temperature sensing probe 26 that is configured to extend through the upper housing 16 and upper heating plate 18 to selectively penetrate and pierce a food item 28 positioned between the upper and lower heating plates 14, 18. In particular, the temperature sensing probe 26 can be inserted into an aperture 48 formed in the upper housing 16 and upper heating plate 18 in order to pierce a food item 28. The probe 26 may also be locked in place, once inserted, by a lock button 50, as discussed in detail below.

As shown in FIGS. 4-8, the temperature sensing probe 26 includes a probe housing 30 having a piercing shaft 32, a rotatable knob 34 that is substantially cylindrical in shape, and a guide cylinder 36. A temperature sensor 38 is housed within a distal tip of the shaft 32 for sensing the internal temperature of food items. A conductive wire 44 connects the temperature sensor 38 to a pair of terminals 46 in the housing 30.

Figure 6:
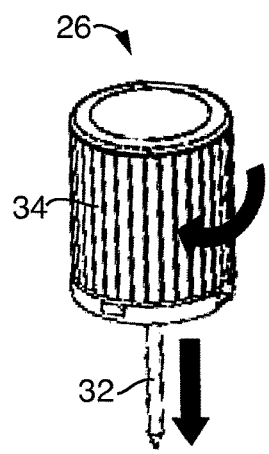
Figure 7:
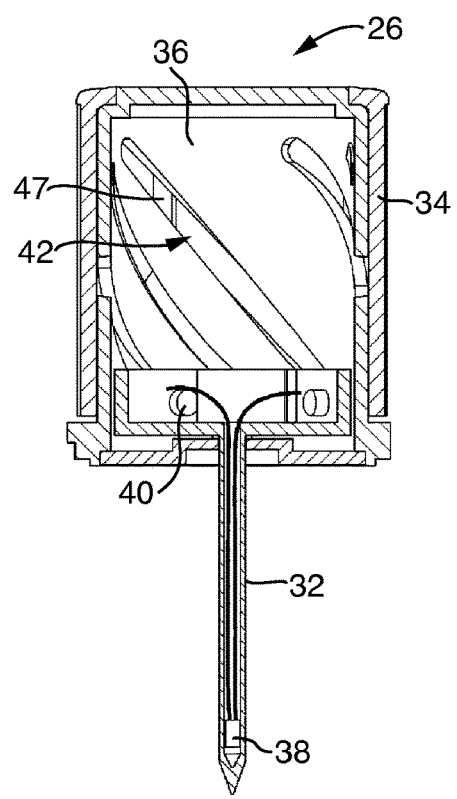
Figure 8:
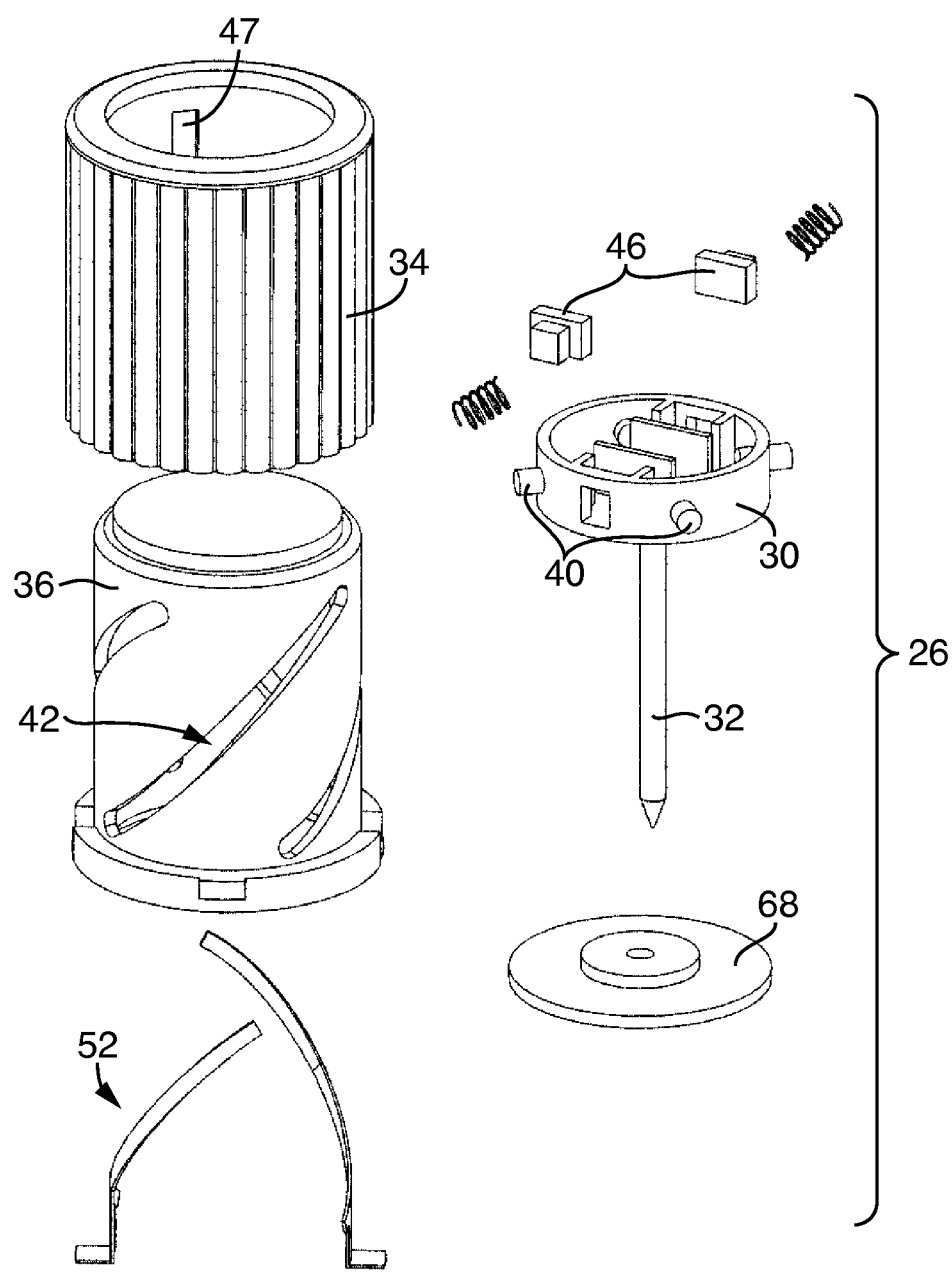
FIG. 8 is an exploded view of the temperature sensing probe of the cooking appliance of FIG. 1.

As also shown in FIGS. 4-8, the probe housing 30 is operatively connected to the guide cylinder 36 via protrusions 40 on the probe housing 30 that are received in angled slots 42 formed in the guide cylinder 36. The guide cylinder 36, in turn, is housed within the rotatable knob 34. The protrusions 40 on the probe housing 30 are also received in substantially vertical grooves 47 formed in the interior of the rotatable knob 34, as best shown in FIG. 8. Importantly, this engagement of the protrusions 40 with knob 34 serves to translate rotation of the knob 34 into corresponding rotation of the probe housing 30.

Figure 4:
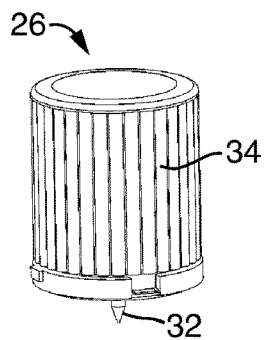
FIGS. 4-7 are various view of the temperature sensing probe of the cooking appliance of FIG. 1.
Figure 5:
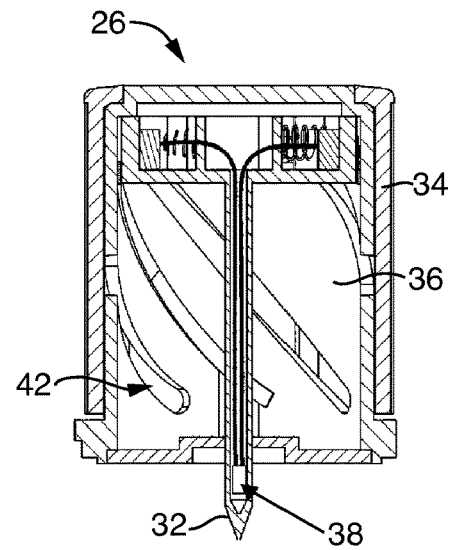

In operation, as the knob 34 is rotated, the probe housing 30 also rotates therewith, due to the engagement of the protrusions 40 on the probe housing with the vertical grooves 47 formed in the knob 34. More specifically, as the knob 34 rotates, the protrusions 40 slide up or down within the vertical groove 47 of the knob 34, and within the angled slots 42 of the guide cylinder 36. This arrangement allows for the selective extension or retraction (depending on the direction of rotation of the knob 34) of the probe housing 30, and thus the piercing shaft 32. FIGS. 4 and 5 illustrate the piercing shaft 32 in a retracted position, while FIGS. 6 and 7 illustrate the piercing shaft 34 in an extended position. In this manner, a user can control the piercing depth of the probe 26 in order to orient the temperature sensor 38 most closely to the middle of the food item 28 being heated.

Figure 9:
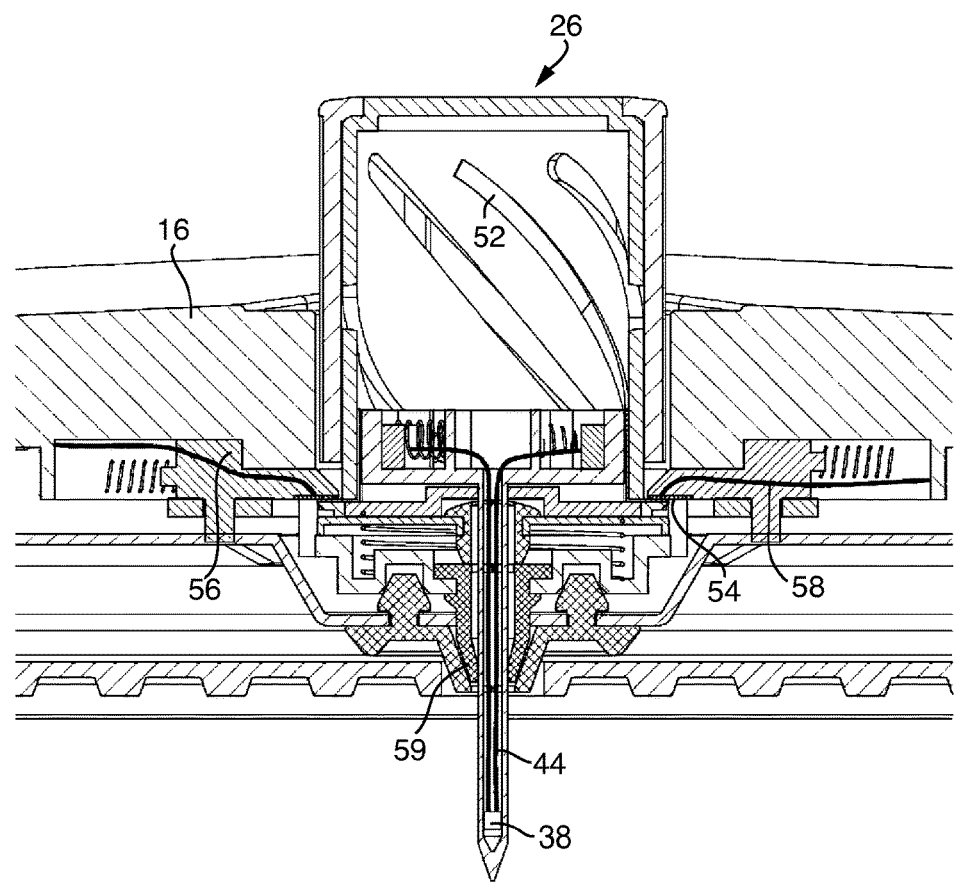
FIGS. 9-15 are various views illustrating operation of the temperature sensing probe of the cooking appliance of FIG. 1.

With reference to FIG. 9, when the temperature sensing probe 26 is positioned in the upper housing 16, a temperature signal is transmitted from the temperature sensor 38 to the printed circuit board (PCB) of a control unit (not shown) housed within the cooking appliance 10. In particular, the temperature sensor 38 is electrically connected to the two terminals 46 via wire 44. These terminals 46 are themselves in contact with a slim conductive strip 52 of the guide cylinder 36. As also shown therein, the slim conductive strip 52 is in contact with a conductive plate 54 of the upper housing 16, which is in contact with terminals 56 in the housing 16. These terminals 56 are electrically coupled to the PCB by conductive wire 58. By way of this conductive pathway, the temperature of a food item is detected by the temperature sensor 38 and is transmitted to the control unit of the cooking appliance 10.

As further shown in FIG. 9, a resilient seal 59 is positioned in the upper housing 16 and surrounds the aperture 48. The seal 59 prevents grease and food from entering the upper housing 106, thereby providing for a degree of cleanliness.

Figure 16:
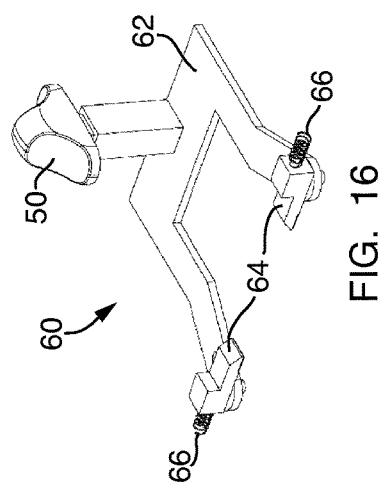
FIG. 16 is a perspective view of a temperature sensing probe locking mechanism of the cooking appliance of FIG. 1.
Figure 17:
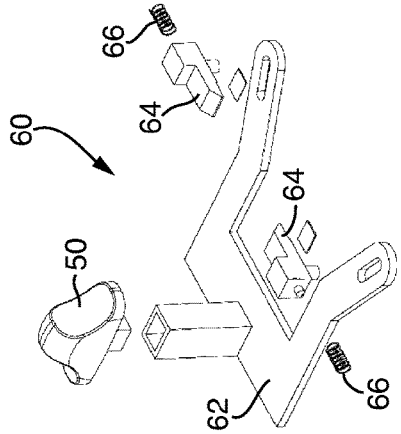
FIG. 17 is an exploded view of the temperature sensing probe locking mechanism of FIG. 16.

As alluded to above, the cooking appliance 10 also includes a locking mechanism 60 for selectively locking the temperature sensing probe 26 in place. As shown in FIGS. 16 and 17, the locking mechanism 60 includes the lock button 50, a substantially U-shaped actuating member 62 connected to the lock button 50, and a pair of sliders 64 each having a spring 66.

Figure 10:
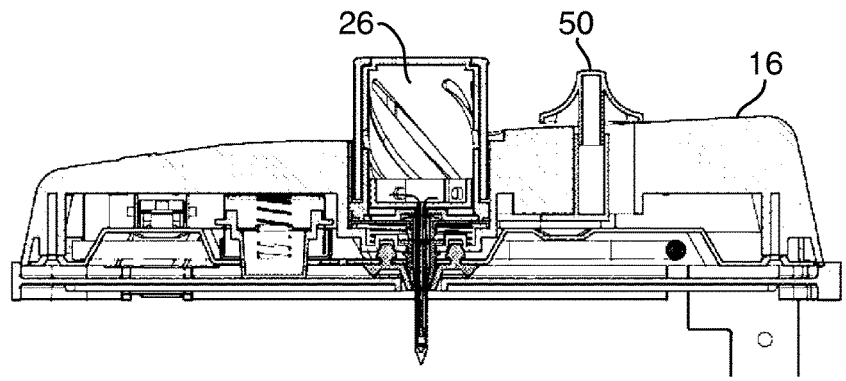
Figure 11:
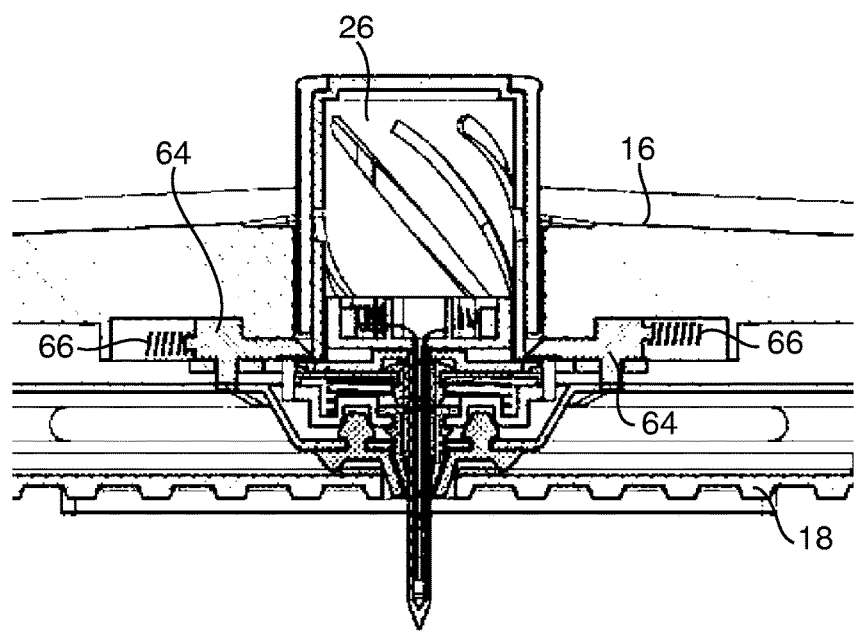
Figure 12:
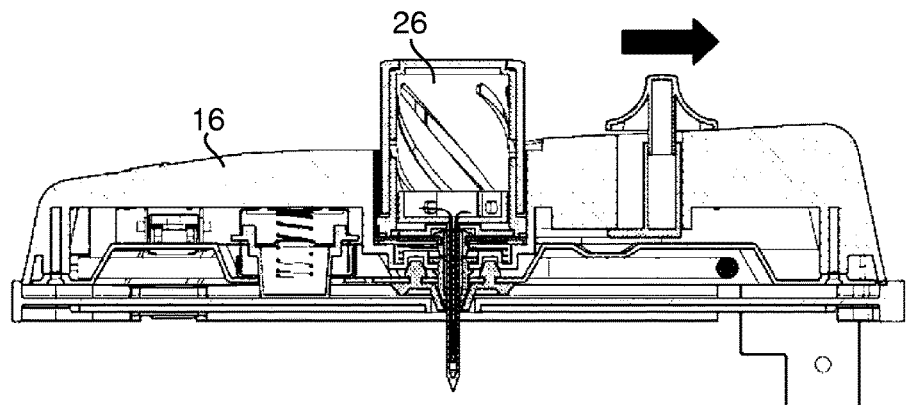
Figure 13:
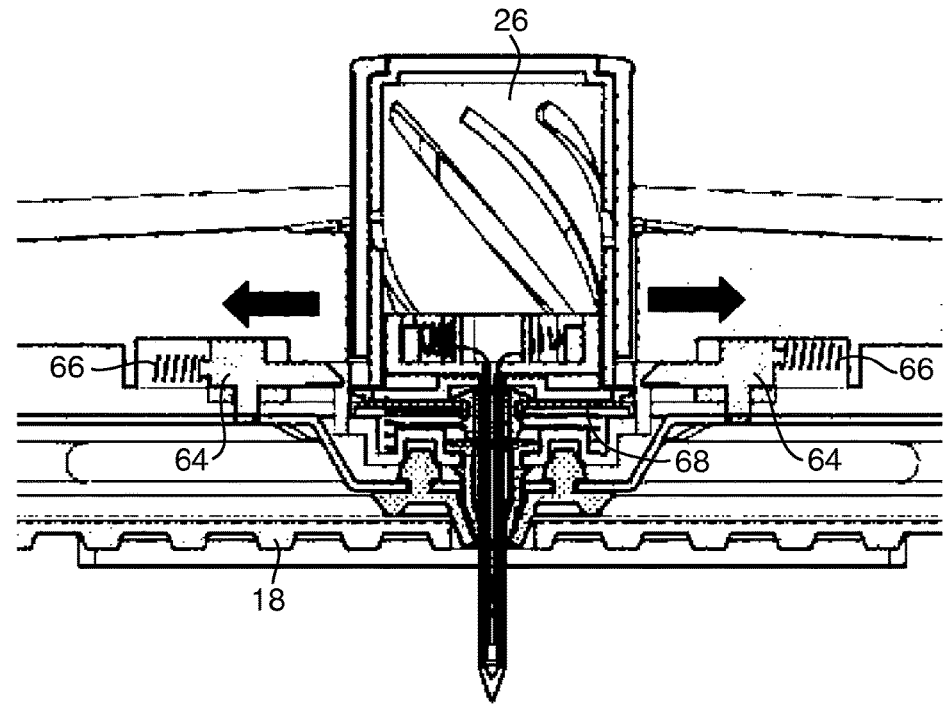
Figure 14:
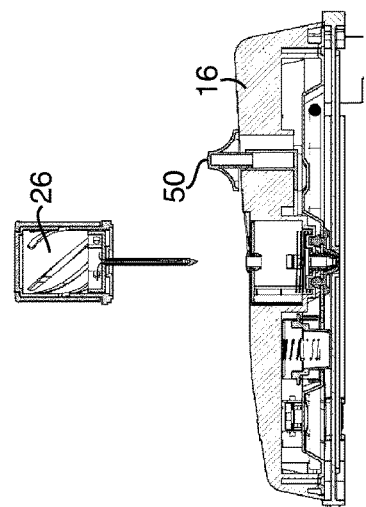
Figure 15:
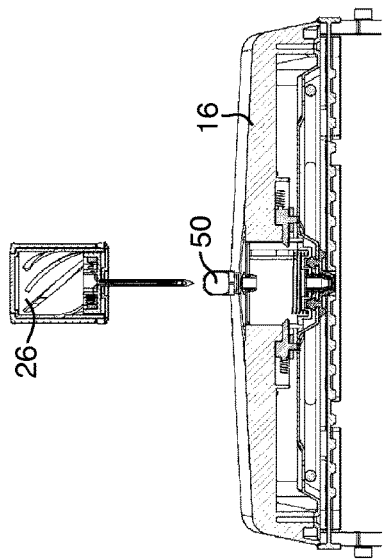

FIGS. 10 and 11 illustrate the temperature probe 26 in a locked position. As shown, the probe 26 is locked in place by the sliders 64. Importantly, as the sliders 64 are spring-biased by springs 66 towards the temperature probe 26, the probe 26 is automatically locked into place when the probe 26 is inserted into the upper housing 16.

FIGS. 12-15, conversely, illustrate unlocking and removal of the temperature sensing probe 26 from the upper housing. As shown therein, movement of the lock button 50 causes the sliders 64 to move against the bias of springs 66 and away from the temperature sensing probe 26. In this position, the temperature sensing probe 26 may be removed from the housing 16, as the sliders 64 are no longer engaged with a retaining plate 68 of the probe 26.

Figure 18:
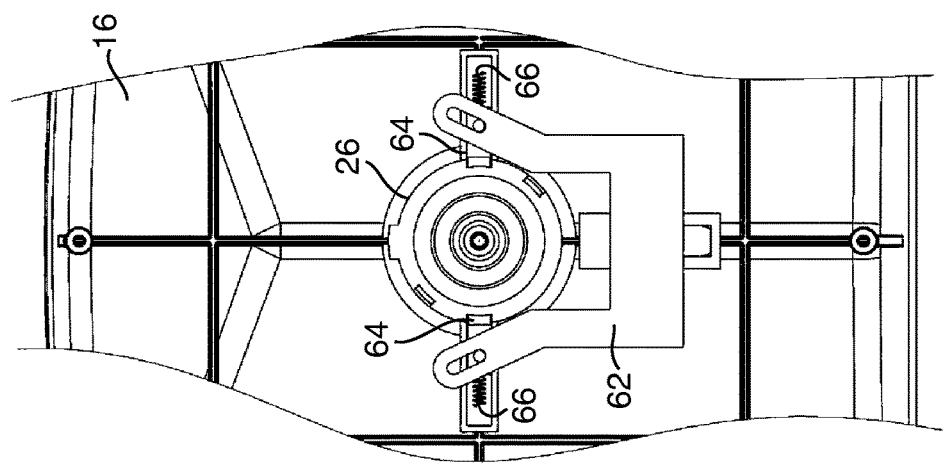
FIG. 18 is a bottom plan view of the locking mechanism of FIG. 16 in a locked position.
Figure 19:
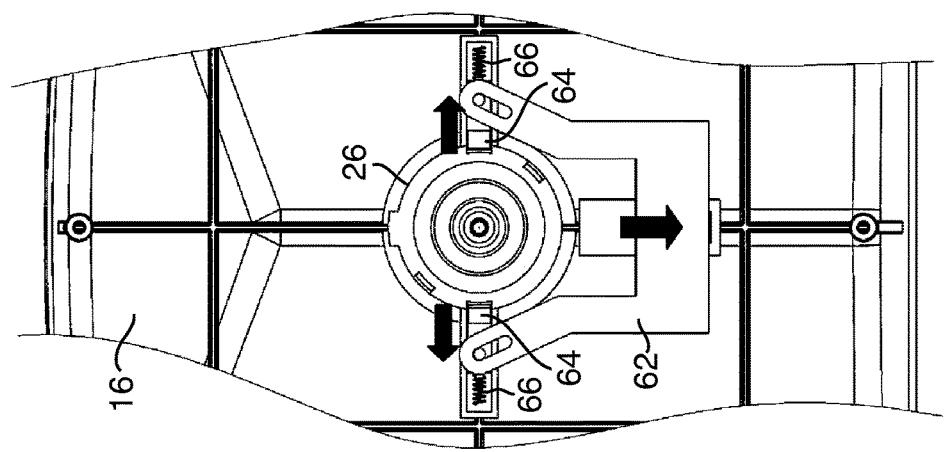
FIG. 19 is a bottom plan view of the locking mechanism of FIG. 16 in an unlocked position.

FIGS. 18 and 19 are bottom views of the upper housing 16 illustrating the locking mechanism 60 in a locked position and unlocked position, respectively.

In the preferred embodiment, the cooking appliance 10 includes a control system that allows a user to precisely control the degree of doneness or temperature of food items. In particular, the control system includes the temperature sensing probe 26 and the control unit, as described above, as well as a control panel 70 on the face of the cooking appliance 10. The control panel 70 includes an array of buttons that allow a user to select and set a variety of cooking or heating parameters. For example, a user can select a desired internal temperature of the food item to be cooked, or a desired degree of doneness. The control unit is configured to control operation of the one or both of the heating plates 14, 18 in dependence upon the preset cooking or heating parameters, and in dependence upon the temperature of a food item detected by the temperature sensing probe 26.

In particular, in operation, a user can select a desired degree of doneness (e.g., rare, medium, well done) utilizing the control panel 70 on the lower housing 12. Throughout the cooking or heating process, the temperature sensing probe 26 continuously or intermittently monitors the internal temperature of the food item and sends a signal to the control unit that is indicative of the detected temperature. When the temperature sensing probe 26 detects the pre-set temperature, or a temperature corresponding to the desired degree of doneness as set by a user, the control unit automatically turns off the heating plates 14, 18 to prevent overcooking. In addition, after the desired temperature is reached, the control unit is configured to generate an audible alert, such as a beep, to indicate to a user that the food item is cooked to the desired doneness.

As will be readily appreciated, the cooking appliance 10 of the present invention therefore provides a level of control over the cooking or heating operations that has heretofore not been possible with existing devices. In particular, the configuration of existing cooking appliances typically requires that a user manually insert a meat thermometer into a food item and manually monitor the temperature of the food item. By automatically monitoring the internal temperature of the food throughout cooking, without having to open the appliance 10 or pause cooking, and by controlling operation of the cooking appliance 10 in dependence upon pre-set and detected temperatures, more precise cooking, and therefore better tasting food, is realized.

In addition, the cooking appliance 10 of the present invention provides a greater level of convenience by automatically monitoring the internal temperature of a food item without requiring constant attention by a user. Moreover, the ability to remove the temperature sensing probe 26 from the cooking appliance 10 allows for more convenient use and makes the probe 26 easier to clean.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A cooking appliance, said cooking appliance comprising:
   an upper housing having a first heating surface selectively contacting a food item,
   a lower housing having a second heating surface selectively contacting said food item,
   a control panel having one or more input means for allowing a user to select at least one input parameter, said at least one input parameter including a desired internal temperature of said food item;
   a control unit integrated with said cooking appliance;
   a temperature sensing system, said temperature sensing system comprising
     a temperature sensing probe, said temperature sensing probe being removably received by said upper housing and selectively extending through said first heating surface;
     wherein said control unit being in electrical communication with said temperature sensing probe and said control panel, said control unit selectively operating said cooking appliance in dependence upon data from said temperature sensing probe;
     wherein said temperature sensing probe includes a rotatable knob and a piercing shaft having a temperature sensor, said piercing shaft being extendable from a first position, in which said piercing shaft is substantially contained within said upper housing, to a second position, in which said piercing shaft protrudes from said upper housing to pierce said food item;
     wherein rotation of said rotatable knob effects the extension of said piercing shaft from said first position to said second position;
   wherein said temperature sensing probe further includes a guide cylinder and a probe housing having at least one protrusion extending from said housing;
   wherein said at least one protrusion is received in an angled slot formed in said guide cylinder and a substantially vertical groove formed in said rotatable knob; and
   wherein said guide cylinder is housed within said rotatable knob;
   wherein said cooking appliance further comprising an electrical pathway connecting said control unit and said temperature sensing probe when said temperature sensing probe is received by said upper housing;
   wherein said electrical pathway comprising at least one terminal in electrical communication with a temperature sensor in said temperature sensing probe, and said at least one terminal is in electrical communication with a conductive strip in said guide cylinder, and said conductive strip is in electrical communication with said control unit.

2. The cooking appliance of claim 1, wherein:
   said control unit is configured to control operation of at least one of said first and said second heating surfaces in dependence upon said at least one input parameter and an internal temperature of said food item detected by said temperature sensing probe.

3. The cooking appliance of claim 1, further comprising:
   a locking mechanism for selectively locking said temperature sensing probe to said upper housing.

4. The cooking appliance of claim 3, wherein:
   said locking mechanism includes a lock button, a substantially U-shaped actuating member and a pair of opposed sliders, said sliders being configured to selectively engage said temperature sensing probe to lock said probe to said upper housing by engaging a retaining plate of said probe.

5. The cooking appliance of claim 1, wherein:
   said control unit is configured to deactivate said first and second heating surfaces when said desired internal temperature is detected by said temperature sensing probe.

6. The cooking appliance of claim 1, wherein:
   said control unit is configured to generate an audible alert when said desired internal temperature is detected by said temperature sensing probe.

7. A cooking appliance, comprising:
   an upper housing having an upper heating surface which selectively contacts a food item and a lower housing having a lower heating surface which selectively contacts said food item;
   a temperature sensing probe received by said upper housing and selectively extending through said upper heating surface;
   a control panel having one or more input means for allowing a user to select at least one input parameter, said at least one input parameter including a desired internal temperature or doneness of said food item; and
   a control unit in electrical communication with said temperature sensing probe and said control panel,
   wherein said temperature sensing probe comprising a rotatable knob and a piercing shaft, said piercing shaft is selectively movable between a first position, in which said extends through said upper heating surface, and a second position, in which said piercing shaft is retracted substantially into said rotatable knob and does not extend through said upper heating surface,
   wherein rotation of said rotatable knob effects the extension of said piercing shaft from said first position to said second position;
   wherein said temperature sensing probe further includes a guide cylinder and a probe housing having at least one protrusion extending from said housing;
   wherein said at least one protrusion is received in an angled slot formed in said guide cylinder and a substantially vertical groove formed in said rotatable knob; and
   wherein said guide cylinder is housed within said rotatable knob;
   wherein said cooking appliance further comprising an electrical pathway connecting said control unit and said temperature sensing probe when said temperature sensing probe is received by said upper housing;
   wherein said electrical pathway comprising at least one terminal in electrical communication with a temperature sensor in said temperature sensing probe, and said at least one terminal is in electrical communication with a conductive strip in said guide cylinder, and said conductive strip is in electrical communication with said control unit.

8. The cooking appliance of claim 7, wherein:
   said temperature sensing probe is selectively removable from said upper housing.

9. The cooking appliance of claim 7, further comprising:
a locking mechanism for selectively locking said temperature sensing probe to said upper housing.

10. The cooking appliance of claim 9, wherein:
said locking mechanism includes a lock button, a substantially U-shaped actuating member and a pair of opposed sliders, said sliders being configured to selectively engage said temperature sensing probe to lock said probe to said upper housing by engaging a retaining plate of said probe.

11. The cooking appliance of claim 7, wherein:
said control unit is configured to control operation of at least one of said first and said second heating surfaces in dependence upon said at least one input parameter and an internal temperature of said food item detected by said temperature sensing probe.

12. The cooking appliance of claim 11, wherein:
said control unit is configured to deactivate said first and second heating surfaces when said desired internal temperature or doneness is detected by said temperature sensing probe.

* * * * *